Oct. 2, 1956   J. TATKO   2,765,137
PALLETS
Filed Oct. 5, 1954

INVENTOR.
JOHN TATKO.
BY
ATTORNEY.

United States Patent Office 2,765,137
Patented Oct. 2, 1956

2,765,137

PALLETS

John Tatko, Middle Granville, N. Y., assignor to Tatko Brothers Slate Co. Inc., Middle Granville, N. Y., a corporation of New York Application October 5, 1954, Serial No. 460,371

2 Claims. (Cl. 248—120)

This invention concerns pallets in general and more particularly the type employed in the slate products industry for holding, transporting and/or storing slate items, such as, for example, slabs, flagstones, roofing slates, tilestones, etc.

Slate is a stratified, metamorphic rock which has the property of splitting into thin sheets, and finds its greatest use as roofing and in the manufacture of blackboards, billiard tables, and electrical appliances. Slate is formed when shale or clay is subjected to great pressure and heat in the earth. It occurs in thin, parallel planes which can be easily split into thin sheets and formed or manufactured into slabs or plates.

Flagstone is a fissile or cleavable sandstone which splits up into flags or flat stones used for paving.

A quarry is the place where the stones are dug from the earth or separated from a large mass of rock and hewn, split and squared into slabs, plates or slates for building purposes and construction work. The process is known as quarrying.

In the slate quarry industry, the handling of slate slabs or panels coming from the quarry, storing the same and transporting the same for shipment has always been a serious handling problem. On account of the weight, differences in sizes and possibility of breakage which is an economic loss, there has been a need for a simplified, efficient and practical handling method.

It is an object of the present invention to provide a very efficient, practical, economical and stable pallet for holding, transporting and/or storaging slabs of slate, flagstone, tilestone or the like.

It is a further object of the present invention to provide a pallet for slate products which is easy to manipulate and capable of transporting the slate products as desired.

A further object of the present invention resides in the provision of a slate or flagstone products pallet which is adapted for use at the splitting mill where the slate or flagstone is sawed and/or split, or in the yard where the same is made ready for shipment.

Yet another object of the present invention is to provide a pallet whereon the product in the form of roofing slate, flagstone, floor slabs, or the like may be arranged from the conveyor line or yard and remain there ready for delivery from the trailer or other instrumentality of transportation to the point of destination, the pallet thus, not only functioning as a carrier but also as a storage means until the material is used up.

A still further object of the present invention resides in the provision of a pallet having means adapted to receive the raising forks conventional on trucks used for transporting the slate or flagstone.

Various further and more specific purposes, features and advantages will clearly appear from the detailed description given below taken in connection with the accompanying drawings which form a part of this specification and illustrate merely by way of example one embodiment of the device of the invention.

The invention consists in such novel features, arrangements and combinations of parts as may be shown and described in connection with the apparatus herein disclosed by way of example only and as illustrative of a preferred embodiment.

In the following description and in the claims, parts will be identified by specific names for convenience, but such names are intended to be as generic in their application to similar parts as the art will permit. Like reference characters denote like parts in the several figures of the drawing.

Referring now to the drawing.

Figures 1, 2:
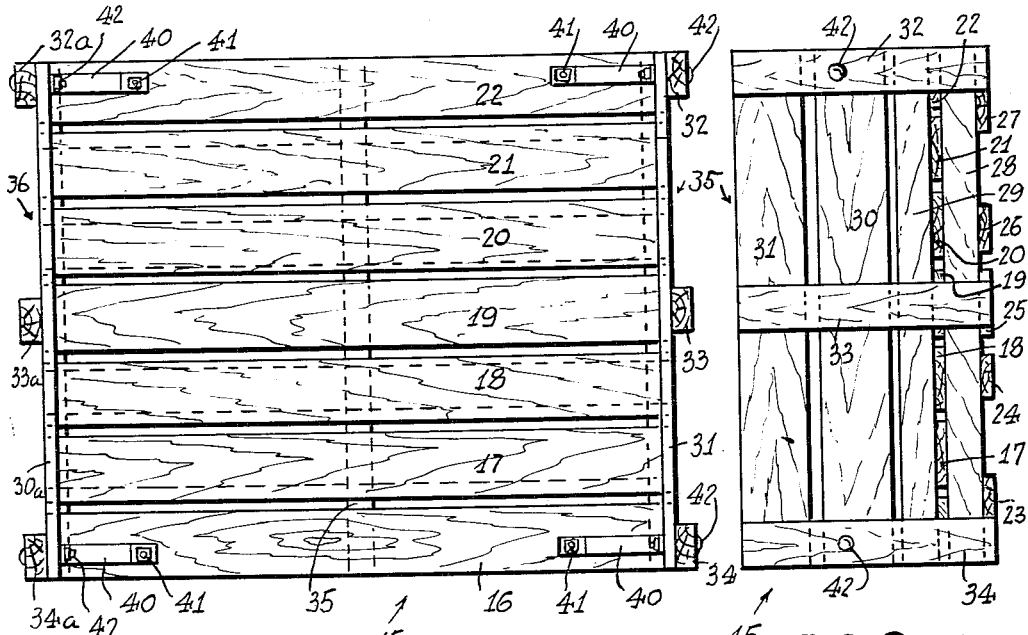
Fig. 1 is a top plan view of a pallet according to the invention.
Fig. 2 is a right-hand end view thereof.

Referring more particularly to the drawing there is disclosed a pallet generally indicated by the numeral 15, having the upper longitudinally disposed boards 16, 17, 18, 19, 20, 21, 22, forming the top floor of the pallet and the lower longitudinally disposed boards 23, 24, 25, 26 and 27, constituting the bottom floor of the pallet, the said top and bottom of the pallet being secured in spaced relation by any suitable means, such as, for example, nails, to the transverse stringers 28, 35, 28a, the spaces 45 providing for the reception of the forks of the lifting truck.

The pallet is provided with the side or end walls generally indicated by the numerals 35, 36, respectively; both walls 35, 36 may be of the same height or one may be lower than the other as shown in the drawing to facilitate arranging and loading of the slabs from the higher end wall 35 to the lower end wall 36. The loader starts stacking the slabs against the higher end wall, works towards the lower end wall and then works at the front of the lower end wall to finish loading. Because of the lower end wall, the stacker can bend thereover and thus facilitate the loading of the pallet.

Wall 35 may comprise the transverse boards or members 29, 30 and 31 secured to the standards or uprights 32, 33, 34, by any suitable means, such as, for example, nails, or bolts. The wall 35 is maintained in secured upright position by the brackets or braces 40, one end of each brace 40 being secured to the upper or top floor of the pallet by means of bolts 41 and the other end of said brace 40 being secured to the wall 35 by means of bolts 42.

Wall 36 may comprise the transverse boards or members 29a, 30a secured to the standards or uprights 32a, 33a, 34a, by any suitable means, such as, for example nails or bolts. The wall 36 is maintained in secured upright position by the brackets or braces 40, one end of each brace 40 being secured to the upper or top floor of the pallet by means of bolts 41 and the other end of said brace 40 being secured to the wall 36 by means of bolts 42.

Figure 3:
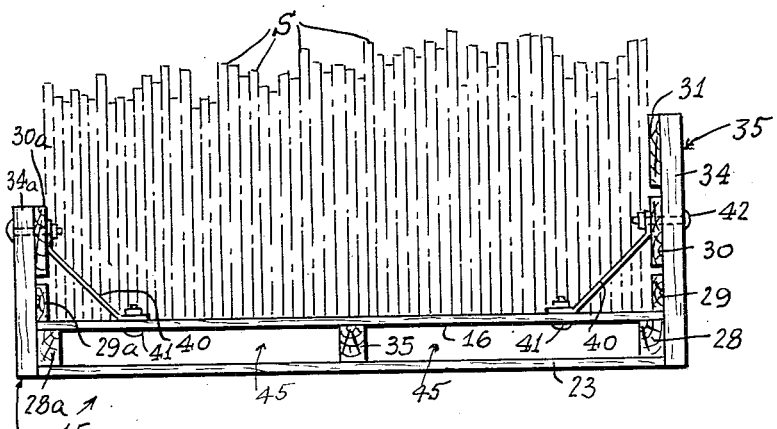
Fig. 3 is a front elevational view thereof indicating in phantom outline slabs disposed thereon in vertical condition.

Fig. 3, which is a front elevational view of the pallet, shows in phantom outline, slabs S vertically arranged upon the upper floor of the pallet.

It is preferable to make the pallet from wood because of its weight, cost and strength. It is to be understood, however, that if wood is used the same may be weatherproofed. The words "board" and "stringer" are intended to embrace any enlongated member made of any material suitable for the intended purposes herein set forth.

The spacers 45 are used for permitting the arms or forks of hoists to enter the pallet for raising, lowering, or moving about the pallet. From the foregoing, it can be readily seen that there has herein been provided a pallet for supporting a plurality of slabs comprising a pair of spaced apart horizontal floors, upper and lower respectively, end stringers between the floors secured to the latter, a stringer intermediate the aforementioned stringers, vertical side walls abutting the ends of the floors, and means for maintaining the walls in fixed upright position which means comprises braces substantially at the corners of the pallet, each of the braces being secured to the upper floor and to one of the walls.

While the invention has been described and illustrated with respect to a certain particular preferred example which gives satisfactory results, it will be understood by those skilled in the art after understanding the principle of the invention, that various changes and modifications may be made without departing from the spirit and scope of the invention and it is intended therefore in the appended claims to cover all such changes and modifications.

What is claimed is:

1. A pallet for supporting a plurality of flat slabs or the like on end in side-by-side relation comprising a plurality of boards extending side-by-side and forming a horizontal floor, end stringers secured to said floor at the underside thereof, vertical walls at the ends of said floor, each of the said walls comprising a plurality of uprights and horizontal boards secured to said uprights, and means for maintaining said walls in fixed upright condition, said means comprising diagonal braces substantially at the corners of the pallet, each of said braces having bent ends abutting flat against the floor and flat against one of the respective walls, and bolts extending through the bent ends of the braces and through the outermost boards of the floor and through the uprights and horizontal boards, respectively, of the side walls and securing the diagonal braces thereto.

2. A pallet according to claim 1, wherein one of said walls is lower than the other to facilitate arranging and loading of the slabs from the higher wall toward the lower wall by allowing the workman to bend over said lower wall.

References Cited in the file of this patent

UNITED STATES PATENTS

| | | |
|---|---|---|
| 1,764,216 | Laubenheimer | June 17, 1930 |
| 1,912,319 | Svejda | May 30, 1933 |
| 2,471,693 | Lilienfeld | May 31, 1949 |
| 2,632,567 | Richtmyer | Mar. 24, 1953 |

OTHER REFERENCES

Wood Pallet Company Circular, received Feb. 24, 1948, page 5, item No. W. P. 557 248—Pallet Digest.